US006496550B1

(12) United States Patent
Bruccoleri et al.

(10) Patent No.: US 6,496,550 B1
(45) Date of Patent: Dec. 17, 2002

(54) TIME INTERLEAVED DIGITAL SIGNAL PROCESSING IN A READ CHANNEL WITH REDUCED NOISE CONFIGURATION

(75) Inventors: Melchiorre Bruccoleri, Rho; Marco Demicheli, Binago; Daniele Ottini; Alessandro Savo, both of Pavia, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/444,340

(22) Filed: Nov. 19, 1999

(30) Foreign Application Priority Data

Dec. 1, 1998 (EP) ............................................ 98830718

(51) Int. Cl.[7] ............................................ H04L 27/08
(52) U.S. Cl. ...................................... 375/345; 375/350
(58) Field of Search ................................. 375/316, 340, 375/345, 346, 350; 341/126, 144, 155

(56) References Cited

U.S. PATENT DOCUMENTS 6,028,727 A * 2/2000 Vishakhadatta et al. ...... 360/51
6,219,387 B1 * 4/2001 Glover ........................ 375/341
6,292,912 B1 * 9/2001 Cloke et al. .................. 360/31

OTHER PUBLICATIONS

Alini et al.: "A 200–Msample/s Trellis–Coded PRML Read/Write Channel with Analog Adaptive Equalizer and Digital Servo" IEEE Journal of Solid–State Circuits, vol. 32, No. 11, Nov. 1997, pp. 1824–1838, XP000752893 *p. 1824, column 1, line—p. 1835, column 1, line 13.
R. Khoini–Poorfard and J.A. Johns: "Mismatch Effects in Time–Interleaved Oversampling Converters", IEEE International Symposium on Circuits and Systems (ISCAS), Linear Circuits and Systems (LCS), Analog Signal Processing (ASP), vol. 5, May 30, 1994, Jun. 2, 1994—pp. 429–432, XP000592874, *p. 429, column 1, line 13—p. 429, column 2, line 25.

* cited by examiner

*Primary Examiner*—Don N. Vo
(74) *Attorney, Agent, or Firm*—Lisa K. Jorgenson; Allen, Dyer, Doppelt, Milbrath & Gilchrist, P.A.

(57) ABSTRACT

A read and analog-to-digital data conversion channel includes an input circuit receiving an input data stream, and a time interleaved analog-to-digital converter connected to the input circuit. The time interleaved analog-to-digital converter includes a pair of analog-to-digital converters functioning in parallel and at half the clock frequency. A signal path through the time interleaved analog-to-digital converter is subdivided into two parallel paths through the pair of analog-to-digital converters. There is a first path for even bits and a second path for odd bits. A digital post-processing circuit is connected to the two parallel paths of the time interleaved analog-to-digital converter, and has an output providing a reconstructed data stream. At least one adjusting digital-to-analog converter is connected between the digital post-processing circuit and the input circuit for control thereof. The conversion channel further includes an offset circuit for compensating an offset in the pair of analog-to-digital converters in the time interleaved analog-to-digital converter. The offset circuit is controlled by the digital post-processing circuit, and includes first and second distinct offset compensating circuits independently controlled by the digital post-processing circuit.

22 Claims, 4 Drawing Sheets

TIME INTERLEAVED DIGITAL SIGNAL PROCESSING IN A READ CHANNEL WITH REDUCED NOISE CONFIGURATION

FIELD OF THE INVENTION

The present invention relates to data acquisition and digital data processing systems, and, more particularly, to read channels of data stored in a mass memory device.

BACKGROUND OF THE INVENTION

In recent years the mass storage memory market has gone through an enormous growth, especially in the area of magnetic disks. The continuous demand for higher memory capacity and for a higher data processing speed has prompted manufacturers to invest more resources in a highly competitive and rapidly evolving market.

The introduction of digital processing on signals originating from the read pick-ups has produced a significant increase in the linear storage density. For example, the techniques of storing data on magnetic supports, e.g., a magnetic disk, are based on the ability of ferromagnetic materials to remain biased in the direction of the applied magnetic field, even when the magnetic field is no longer applied. The data are stored by either inverting or not inverting the direction of magnetization on the disk. During a read phase, the presence or absence at a certain instant of a transition in the magnetic flux reveals the data sequence.

For the same magnetic support properties, the distance between two adjacent transitions must be reduced to increase the linear storage density. Eventually, an intersymbol interference (ISI) becomes unavoidable. The problem of a correct detection of symbols affected by ISI and by noise is not limited to magnetic disks. This problem may also arise in similar mass memory supports. Generally, it represents the main problem in data transfer channels, of which the read channels of hard disks drives (HDD) represent just one important example.

The efforts to overcome the problem of ISI have led to the development and use of special coding techniques, such as Partial Response (PR) signaling. These coding techniques are based on the fact that if the ISI on the transmitted data is known, then it can be taken into consideration during reception so that the correct sequence of the original data can be reliably reconstructed.

By sampling the signal originating from a read pick-up with a clock synchronous with the writing clock, it is possible by the use of special algorithms of maximum likelihood (ML) to obtain the most likely data sequence effectively read from the memory support. By combining the PR technique with ML methods, PRML systems are implemented. The PRML decoding techniques work on a sequence of samples and the algorithms are digitally implemented.

The electronics of a read/write channel must ensure a high speed. For some functions, such as clock generation, for example, it is also necessary to have a very high accuracy. The variety of necessary circuits include analog and digital filters, A/D converters and low jitter voltage controlled oscillators (VCO) being among the most significant. Moreover, during a read phase, it is necessary to interface with the reading heads using low noise wide band amplifiers. During a write phase, the writing head must be driven with a relatively high current for a magnetic support.

Currently, a read/write channel with a relatively standard architecture has not yet been established. Various approaches have been proposed to meet the requirement of a higher speed and higher storage density. These approaches range from a completely analog approach to a completely digital approach.

The electronics of a HDD or similar apparatus requires both analog and digital functionality. Manufacturing reasons, such as the standardization of the design and the adaptability among different technologies, foster implementation in the digital domain of functions that historically were implemented with analog circuits. Commonly, the analog part is dedicated to the correct generation of timing signals for writing and reading, and for interfacing with the heads, e.g., Pre-Amp, VGA, MRA, LPF, OFFSET-STAGE, ATOD, VCO, etc., as shown in FIG. 1. The digital part is dedicated to the processing of data and for communicating with a data bus of the system, e.g., digital filters, maximum-likelihood detector, encoder-decoder, etc.

By way of example, a typical functional scheme of a single stream HDD read channel with digital processing of data is depicted in FIG. 1. As shown in the example of FIG. 1, read channels include automatic gain control circuits (AGC) implemented with a variable gain amplifier. The amplifier is controlled by a dedicated digital-to-analog converter DAC_VGA. The converter is controlled by the digital processing circuitry downstream of the analog/digital switch (ATOD) to maintain constant the amplitude of the signal fed to the converter's input.

In case of a magnetic support, such as in a HDD, the Magnetic Resistive Asymmetry (MRA) block eliminates or attenuates the second harmonic, i.e., contribution of the term $a*x^2$, of the input analog signal originating from the read head MR. Even this corrective operation of the signal spectrum is dynamically controlled through a dedicated digital-to-analog converter DAC_MRA. The equalization of the signal is performed by the low pass filter LPF that controls the cut-off frequency through the DAC_FC converter, and the boost through the DAC_BOOST converter. These converters convert analog control signals of the transfer function of the low pass filter LPF via digital commands, e.g., Word_FC and Word_Boost.

In cascade to the equalization low pass filter LPF, an OFFSET STAGE compensates the offset of the digital-to-analog converter present in the ATOD block. Even in this case, there is a control loop for compensating the offset implemented by the DIGITAL POST PROCESSING block and the DAC_OFF converter. Moreover, the DIGITAL POST PROCESSING block maintains a correct sampling synchronized by the ATOD block. The control is implemented by the DAC converter, and the voltage controlled oscillator VCO.

The above described system has several drawbacks. First, the digital data processing after the conversion takes place at full-rate, thus limiting the maximum frequency that the system may reach for a certain available technology. Second, the ATOD block operates at full-rate and represents a real bottleneck for the entire architecture in terms of the maximum possible frequency, current consumption and noise generated in the analog portion.

SUMMARY OF THE INVENTION

A significant enhancement of the performance of a read channel may be obtained by using two distinct offset compensating circuits for the two ATOD converters. A single path is implemented parallel to a time interleaved converter. Each path is independently controlled by the post-processing circuit via a respective digital-to-analog converter.

The appearance of spurious patterns in the frequency domain are prevented by duplicating the compensation elements and by controlling them independently from each other. These signals originate from offset mismatches which are likely to occur between the digital-to-analog converter of the ATOD converter of the signal path for the even bits, and that of the digital-to-analog converter of the ATOD converter of the signal path for the odd bits.

In particular, generation of uncorrelated patterns in the signal spectrum, which would degrade the performance of the entire read channel, are prevented. The converter, in a typical application as that of a modern HDD, works above the Nyquist frequency. These patterns are typically formed by lines in correspondence of multiples of Fs/2.

DETAILED DESCRIPTION OF THE PREFERRED EMBODIMENTS

Figure 1:
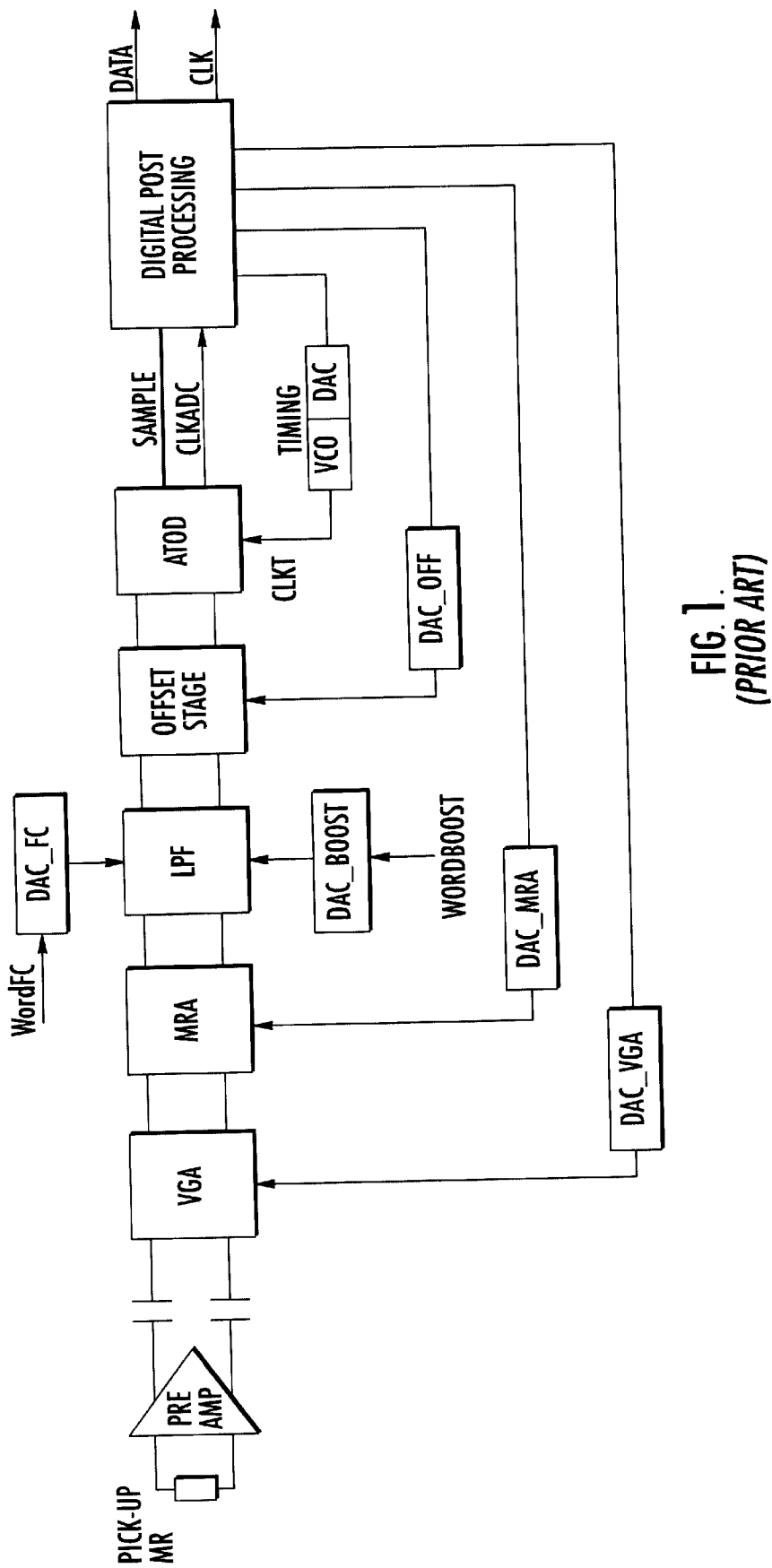
FIG. 1 shows the architecture of a read channel for a single stream HDD with digital post-processing, according to the prior art.
Figure 2:
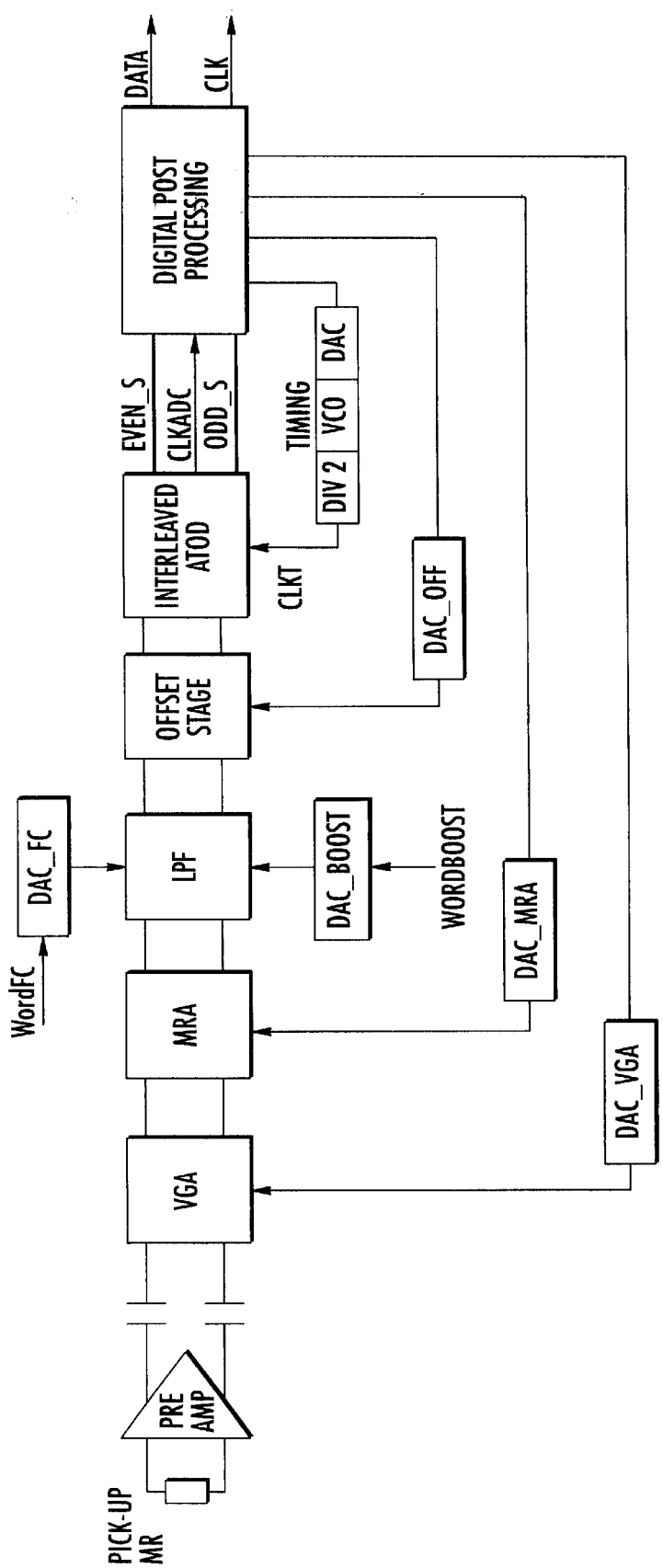
FIG. 2 shows the architecture of a read channel for a split stream HDD with digital post-processing, including a time INTERLEAVED ATOD, according to the present invention.

To overcome or alleviate the above noted drawbacks, a new read channel architecture has been proposed, as shown in FIG. 2. The post conversion digital processing is carried out on two distinct streams. One for the even bits and the other for the odd bits using a time interleaving technique as highlighted in greater detail in FIG. 3. According to this approach, both the digital processing block DIGITAL POST PROCESSING, the time interleaved converter, and the INTERLEAVED ATOD, operate at half-rate, thus offering the possibility to provide for enhanced performances.

Figure 3:
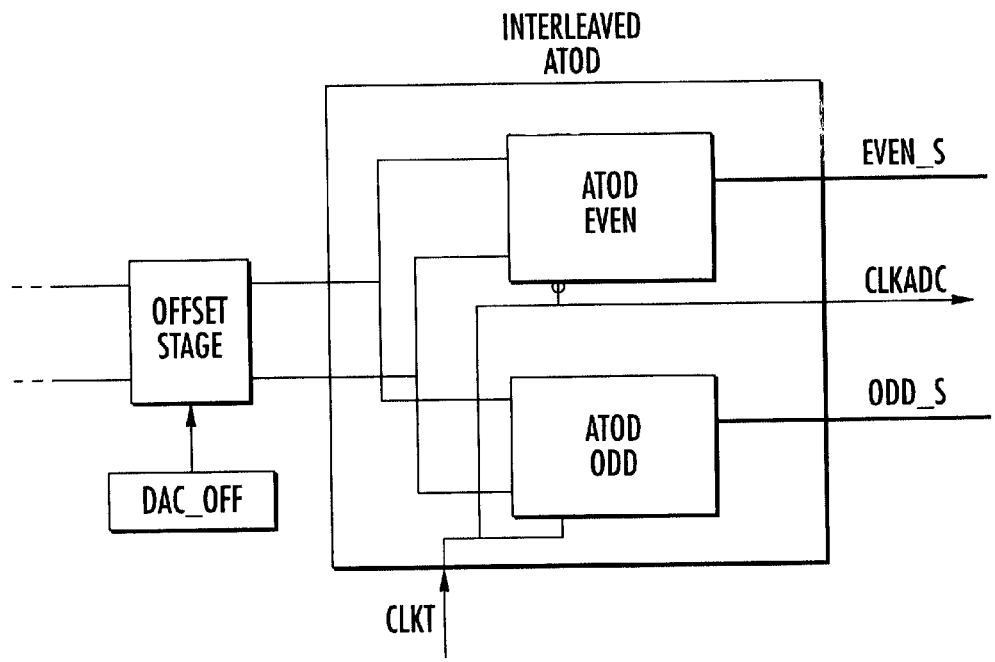
FIG. 3 highlights the internal structure of a time INTERLEAVED ATOD converter illustrated in FIG. 2.

An architecture of this type is described in greater detail in the article "A 200-Msample/s Trellis-Coded PRML Read/Write Channel with Analog Adaptive Equalizer and Digital Servo," IEEE Journal of Solid-State Circuits, Vol. 32, No. 11, November 1997. The architecture of FIG. 2 is based on the use of an INTERLEAVED ATOD converter whose structure is shown in FIG. 3. The structure includes two distinct identical comparators, ATOD_EVEN and ATOD_ODD, which divide the data stream into two digital output streams. One for even bits EVEN_S, and the other for odd bits ODD_S. In general, a tradeoff of time interleaved approaches is an increment of the circuit complexity and, consequently, of the area occupied by the converter on the silicon.

The increment of throughput obtained by introducing a parallel signal path includes two sides. One side offers advantages as it breaks the tight link between the maximum speed obtainable by a circuit and the limits to it imposed by the technology, i.e., cut-off frequency of transistors, settling time of the amplifier, etc. The other side introduces problems related to ensuring a somewhat perfect path matching.

The existence of mismatches of gain, offset and/or timing, translates itself in an increment of the error mean power or noise and/or in the appearance of spurious patterns in the frequency domain. These may fall in the signal band, distorting it, as demonstrated in the article "Time Interleaved Converter Arrays," IEEE Journal of Solid-State Circuits, Vol. SC-15, No. 6, December 1980.

Figure 5:
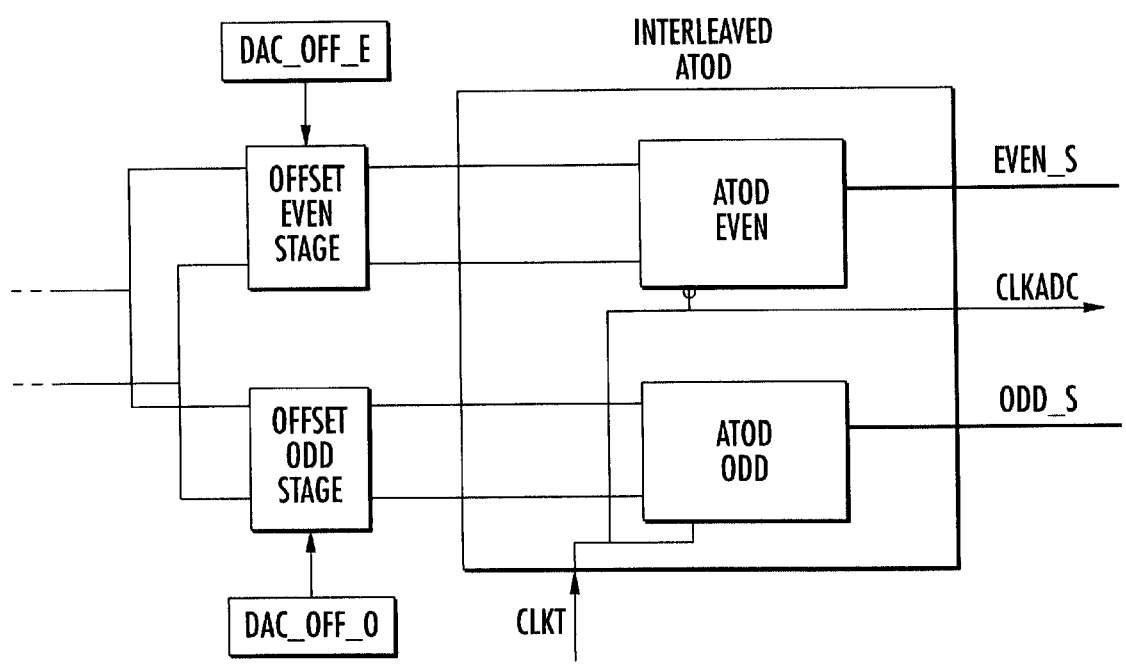
FIG. 5 is a detail diagram of the time INTERLEAVED ATOD converter and of the doubled compensation circuits including the offsets for the two signal paths, according to the present invention.
Figure 4:
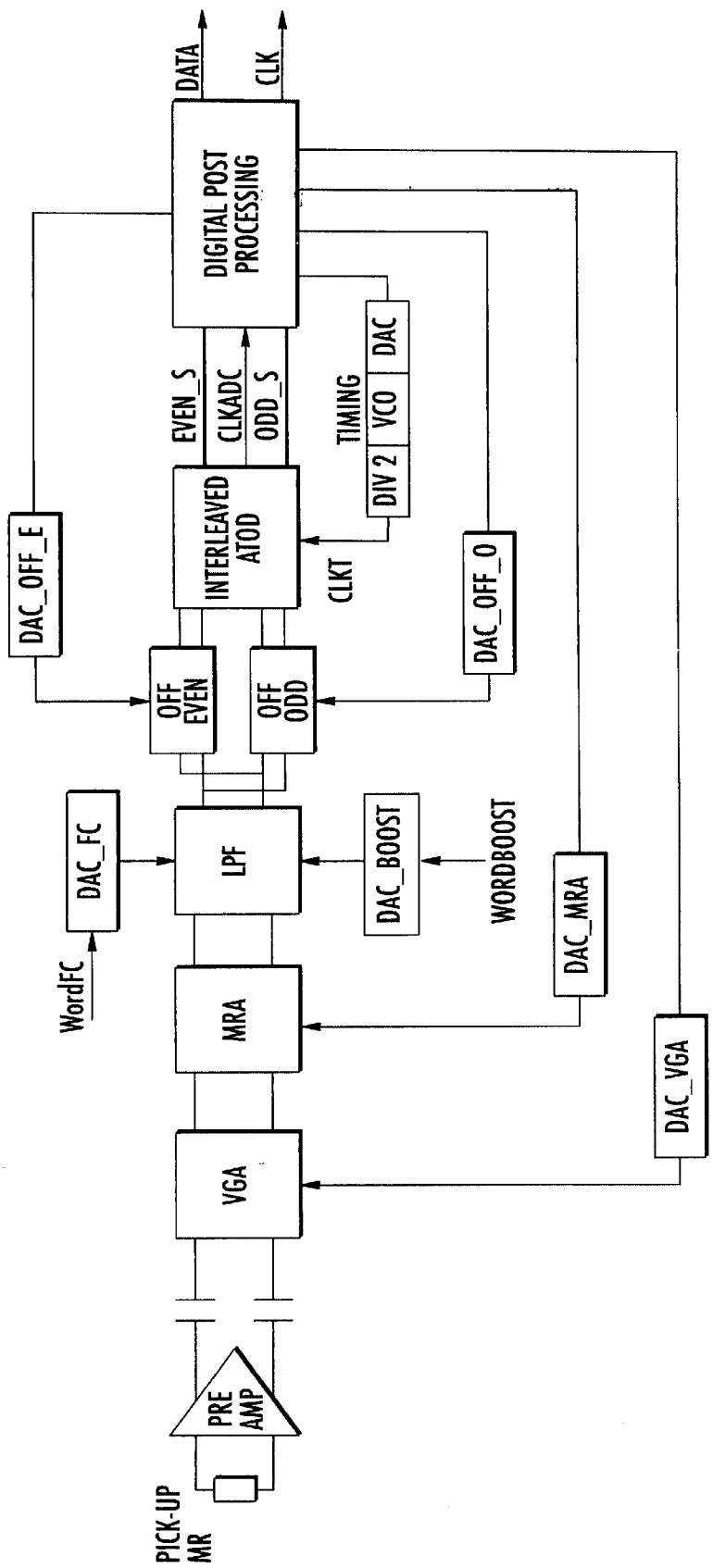
FIG. 4 shows the architecture of a read channel for a split stream HDD modified according to the present invention.

Referring to FIGS. 4 and 5, the INTERLEAVED ATOD converter is formed by two identical analog-to-digital converters. One is ATOD_EVEN for the signal path of the even bits EVEN_S. The other ATOD_ODD is for the signal path of the odd bits ODD_S. The two converters ATOD_EVEN, ATOD_ODD function in parallel and advantageously at a half-rate clock frequency.

According to the invention, the offset of the digital-to-analog converter contained in each of the two analog-to-digital converters ATOD_EVEN, ATOD_ODD is independently compensated through a respective loop. Each loop includes an offset compensating stage OFFSET_EVEN_STAGE, OFFSET_ODD_STAGE controlled by the digital post-processing block DIGITAL POST-PROCESSING. This is done through a dedicated digital-to-analog converter DAC_OFF_E and DAC_OFF_O.

That which is claimed is:

1. A read and analog-to-digital data conversion channel comprising:

a preamplifier circuit receiving an input data stream;

an automatic gain control circuit connected to said preamplifier circuit;

a harmonic filter connected to said automatic gain control circuit;

an equalizing low pass filter connected to said harmonic filter;

a time interleaved analog-to-digital converter connected to said equalizing low pass filter and comprising a pair of analog-to-digital converters functioning in parallel and at half a clock frequency, said time interleaved analog-to-digital converter having a signal path being subdivided into two parallel paths through said pair of analog-to-digital converters, a first path for even bits and a second path for odd bits;

a digital post-processing circuit connected to the two parallel paths of said time interleaved analog-to-digital converter, and having an output providing a reconstructed data stream;

at least one adjusting digital-to-analog converter connected between said digital post-processing circuit and at least one of said automatic gain control circuit, said harmonic filter and said equalizing low pass filter for respective control thereof; and an offset circuit for compensating an offset in said pair of analog-to-digital converters in said time interleaved analog-to-digital converter, said offset circuit being controlled by said post-processing circuit, and comprising first and second offset compensating portions independently controlled by said digital post-processing circuit.

2. A read and analog-to-digital data conversion channel according to claim 1, wherein said pair of analog-to-digital converters in said time interleaved analog-to-digital converter are identical in performance.

3. A read and analog-to-digital data conversion channel according to claim 1, wherein said at least one adjusting digital-to-analog converter comprises an adjusting digital-to-analog converter connected between said digital post-processing circuit and said automatic gain control circuit for control thereof.

4. A read and analog-to-digital data conversion channel according to claim 1, wherein said at least one adjusting digital-to-analog converter comprises an adjusting digital-to-analog converter connected between said digital post-processing circuit and said harmonic filter for control thereof.

5. A read and analog-to-digital data conversion channel according to claim 1, wherein said at least one adjusting digital-to-analog converter comprises:
   a first adjusting digital-to-analog converter connected between said digital post-processing circuit and said equalizing low pass filter for controlling a first characteristic thereof; and
   a second adjusting digital-to-analog converter connected between said digital post-processing circuit and said equalizing low pass filter for controlling a second characteristic thereof.

6. A read and analog-to-digital data conversion channel according to claim 5, wherein the first characteristic is a cutoff frequency of said equalizing low pass filter; and wherein the second characteristic is a frequency boost of said equalizing low pass filter.

7. A read and analog-to-digital data conversion channel according to claim 1, further comprising:
   a first offset digital-to-analog converter connected between said digital post-processing circuit and said first offset compensating circuit portion for control thereof; and
   a second offset digital-to-analog converter connected between said digital post-processing circuit and said second offset compensating circuit portion for control thereof.

8. A read and analog-to-digital data conversion channel according to claim 1, wherein said first and second offset compensating circuits in said offset means each comprises an offset compensating stage.

9. A read and analog-to-digital data conversion channel comprising:
   an input circuit receiving an input data stream;
   a time interleaved analog-to-digital converter connected to said input circuit, and comprising a pair of analog-to-digital converters functioning in parallel and at half a clock frequency, said time interleaved analog-to-digital converter having a signal path being subdivided into two parallel paths through said pair of analog-to-digital converters;
   a digital post-processing circuit connected to the two parallel paths of said time interleaved analog-to-digital converter, and having an output providing a reconstructed data stream;
   at least one adjusting digital-to-analog converter connected between said digital post-processing circuit and said input circuit for control thereof; and
   an offset circuit for compensating an offset of said pair of analog-to-digital converters in said time interleaved analog-to-digital converter, said offset circuit being controlled by said post-processing circuit, and comprising first and second offset compensating circuit portions independently controlled by said digital post-processing circuit.

10. A read and analog-to-digital data conversion channel according to claim 9, wherein the two parallel paths through said pair of analog-to-digital converters in said time interleaved analog-to-digital converter comprises a first path for even bits and a second path for odd bits.

11. A read and analog-to-digital data conversion channel according to claim 9, wherein said input circuit comprises:
   a preamplifier circuit receiving the input data stream;
   an automatic gain control circuit connected to said preamplifier circuit;
   a harmonic filter connected to said automatic gain control circuit; and
   an equalizing low pass filter connected to said harmonic filter and to said time interleaved analog-to-digital converter.

12. A read and analog-to-digital data conversion channel according to claim 9, wherein said pair of analog-to-digital converters in said time interleaved analog-to-digital converter are identical in performance.

13. A read and analog-to-digital data conversion channel according to claim 11, wherein said at least one adjusting digital-to-analog converter is connected between said digital post-processing circuit and said at least one of said automatic gain control circuit, said harmonic filter and said equalizing low pass filter for respective control thereof.

14. A read and analog-to-digital data conversion channel according to claim 13, wherein said at least one adjusting digital-to-analog converter comprises an adjusting digital-to-analog converter connected between said digital post-processing circuit and said automatic gain control circuit for control thereof.

15. A read and analog-to-digital data conversion channel according to claim 13, wherein said at least one adjusting digital-to-analog converter comprises an adjusting digital-to-analog converter connected between said digital post-processing circuit and said harmonic filter for control thereof.

16. A read and analog-to-digital data conversion channel according to claim 13, wherein said at least one adjusting digital-to-analog converter comprises:
   a first adjusting digital-to-analog converter connected between said digital post-processing circuit and said equalizing low pass filter for controlling a first characteristic thereof; and
   a second adjusting digital-to-analog converter connected between said digital post-processing circuit and said equalizing low pass filter for controlling a second characteristic thereof.

17. A read and analog-to-digital data conversion channel according to claim 16, wherein the first characteristic is a cutoff frequency of said equalizing low pass filter; and wherein the second characteristic is a frequency boost of said equalizing low pass filter.

18. A read and analog-to-digital data conversion channel according to claim 9, further comprising:
   a first offset digital-to-analog converter connected between said digital post-processing circuit and said first offset compensating circuit for control thereof; and
   a second offset digital-to-analog converter connected between said digital post-processing circuit and said second offset compensating circuit for control thereof.

19. A method for converting data in a read and analog-to-digital conversion channel, the method comprising the steps of:
   receiving an input data stream via an input circuit;
   operating a pair of analog-to-digital converters in parallel and at half a clock frequency in a time interleaved analog-to-digital converter connected to the input circuit, and dividing a signal path of the time interleaved analog-to-digital converter into two parallel paths through the pair of analog-to-digital converters, a first path for even bits and a second path for odd bits;
   processing a signal on the two parallel paths using a digital post-processing circuit connected to the two parallel paths in the time interleaved analog-to-digital converter, and providing a reconstructed data stream;

controlling the input circuit using at least one adjusting digital-to-analog converter connected between the digital post-processing circuit and the input circuit for control thereof; and compensating an offset in the pair of analog-to-digital converters in the time interleaved analog-to-digital converter, the pair of analog-to-digital converters being controlled by the digital post-processing circuit, the time interleaved analog-to-digital converter comprising first and second offset compensating circuit portions independently controlled by the digital post-processing circuit.

20. A method according to claim 19, wherein the two parallel paths through the pair of analog-to-digital converters in the time interleaved analog-to-digital converter comprises a first path for even bits and a second path for odd bits.

21. A method according to claim 19, wherein the pair of analog-to-digital converters in the time interleaved analog-to-digital converter are identical in performance.

22. A method according to claim 19, further comprising the steps of:

controlling the first offset compensating circuit connected between the digital post-processing circuit and the first offset compensating circuit; and controlling the second offset compensating circuit connected between the digital-to-analog converter and the second offset compensating circuit.

* * * * *